(12) United States Patent
Otsu

(10) Patent No.: US 11,603,902 B2
(45) Date of Patent: Mar. 14, 2023

(54) LIQUID SEAL BUSHING

(71) Applicant: Prospira Corporation, Kawasaki (JP)

(72) Inventor: Kazutaka Otsu, Tokyo (JP)

(73) Assignee: Prospira Corporation, Kawasaki (JP)

( * ) Notice: Subject to any disclaimer, the term of this patent is extended or adjusted under 35 U.S.C. 154(b) by 12 days.

(21) Appl. No.: 17/607,916

(22) PCT Filed: Jan. 31, 2020

(86) PCT No.: PCT/JP2020/003704
§ 371 (c)(1),
(2) Date: Nov. 1, 2021

(87) PCT Pub. No.: WO2020/230375
PCT Pub. Date: Nov. 19, 2020

(65) Prior Publication Data
US 2022/0221024 A1    Jul. 14, 2022

(30) Foreign Application Priority Data

May 15, 2019 (JP) .............................. JP2019-091936

(51) Int. Cl.
*F16F 13/28* (2006.01)
*F16F 13/14* (2006.01)

(52) U.S. Cl.
CPC .............. *F16F 13/28* (2013.01); *F16F 13/14* (2013.01)

(58) Field of Classification Search
CPC .............. F16F 13/14; F16F 13/26; F16F 13/28
(Continued)

(56) References Cited

U.S. PATENT DOCUMENTS 4,650,170 A * 3/1987 Fukushima ............. F16F 13/10
267/140.14
5,076,550 A * 12/1991 Mayama ................. F16F 13/28
267/219

(Continued)

FOREIGN PATENT DOCUMENTS

JP    H01135939 A    5/1989
JP    09-280304 A    10/1997

(Continued)

OTHER PUBLICATIONS

International Search Report for PCT/JP2020/003704 dated Mar. 17, 2020 (PCT/ISA/210).

(Continued)

*Primary Examiner* — Thomas W Irvin
(74) *Attorney, Agent, or Firm* — Kenja IP Law PC

(57) ABSTRACT

A liquid seal bushing includes an outer member, an inner member, and an elastic body which connects the outer member and the inner member to each other. The bushing includes two liquid chambers, a connection path which connects the two liquid chambers and extends in one direction, a first communication path which allows communication between one end portion of both end portions of the connection path, the one end portion being located on a side of one liquid chamber of the two liquid chambers, and the other liquid chamber, a second communication path which allows communication between the other end portion of the both end portions of the connection path, and a linear motor provided inside the outer member including a movable element in the connection path and movable in the one direction to closes both openings of the first communication path and the second communication path.

4 Claims, 4 Drawing Sheets

(58) Field of Classification Search
USPC .................................................. 267/140.15
See application file for complete search history.

(56) References Cited

U.S. PATENT DOCUMENTS

| | | | | |
|---|---|---|---|---|
| 5,261,649 | A * | 11/1993 | Kato ..................... | F16F 13/28 |
| | | | | 267/140.15 |
| 5,386,275 | A * | 1/1995 | Kato ..................... | F16F 13/264 |
| | | | | 267/140.15 |
| 6,406,010 | B1 * | 6/2002 | Yano ..................... | F16F 13/106 |
| | | | | 267/140.13 |
| 7,537,202 | B2 * | 5/2009 | Watanabe .............. | F16F 13/101 |
| | | | | 267/140.14 |
| 10,336,175 | B2 * | 7/2019 | Yoon ..................... | B60K 5/1208 |
| 2004/0245689 | A1 * | 12/2004 | Loheide ................. | F16F 9/064 |
| | | | | 267/140.14 |
| 2006/0097437 | A1 * | 5/2006 | Watanabe .............. | F16F 13/101 |
| | | | | 267/140.14 |
| 2017/0113534 | A1 | 4/2017 | Mathai et al. | |
| 2017/0313171 | A1 * | 11/2017 | Yoon ..................... | B60K 5/1208 |

FOREIGN PATENT DOCUMENTS

| | | |
|---|---|---|
| JP | 10-058934 A | 3/1998 |
| JP | 2002081490 A | 3/2002 |
| JP | 2009-138922 A | 6/2009 |
| JP | 2018-185018 A | 11/2018 |

OTHER PUBLICATIONS

Jan. 9, 2023, search result of the Extended European Search Report issued by the European Patent Office in the corresponding European Patent Application No. 20805872.7.

* cited by examiner

LIQUID SEAL BUSHING

TECHNICAL FIELD

The present invention relates to a liquid seal bushing.

This application is a National Stage of International Application No. PCT/JP2020/003704, filed Jan. 31, 2020, claiming priority based on Japanese Patent Application No. 2019-091936, filed May 15, 2019, the content of which is incorporated herein by reference.

BACKGROUND ART

Conventionally, a liquid seal bushing is known, which includes an outer member which is attached to any one of a vibration generating portion and a vibration receiving portion, an inner member which is attached to the other and disposed inside the outer member, an elastic body which connects the outer member and the inner member to each other, two liquid chambers which are provided inside the outer member, and a connection path which connects the two liquid chambers, and switches between communication between the two liquid chambers through the connection path and shutting off between the two liquid chambers according to a traveling state of a vehicle.

CITATION LIST

[Patent Document]
[Patent Document 1]
Japanese Unexamined Patent Application, First Publication No. H10-58934

SUMMARY OF INVENTION

Technical Problem

In the conventional liquid seal bushing, there is a problem that it is difficult to prevent an input vibration from propagating to the vibration receiving portion over a wide frequency range.

The present invention is made in view of the above circumstances, and an object of the present invention is to provide a liquid seal bushing capable of preventing the input vibration from propagating to the vibration receiving portion over a wide frequency range.

Solution to Problem

According to a first aspect of the present invention, there is provided a liquid seal bushing including: an outer member which is attached to any one of a vibration generating portion and a vibration receiving portion; an inner member which is attached to the other of the vibration generating portion and the vibration receiving portion and disposed inside the outer member; and an elastic body which connects the outer member and the inner member to each other, in which two liquid chambers, a connection path which connects the two liquid chambers and extends in one direction, a first communication path which allows communication between one end portion of both end portions of the connection path, the one end portion being located on a side of one liquid chamber of the two liquid chambers, and the other liquid chamber of the two liquid chambers, a second communication path which allows communication between the other end portion of the both end portions of the connection path, the other end portion being located on a side of the other liquid chamber, and the one liquid chamber, and a linear motor are provided inside the outer member, and the linear motor includes a movable element which is provided in the connection path to be movable in the one direction, closes both openings of the first communication path and the second communication path in the connection path, and opens each opening according to a movement in the one direction, and a coil which surrounds the movable element.

Advantageous Effects of Invention

According to the present invention, it is possible to prevent an input vibration from propagating to a vibration receiving portion over a wide frequency range.

DESCRIPTION OF EMBODIMENTS

Hereinafter, a liquid seal bushing according to a first embodiment of the present invention will be described with reference to the drawings.

Figure 1:
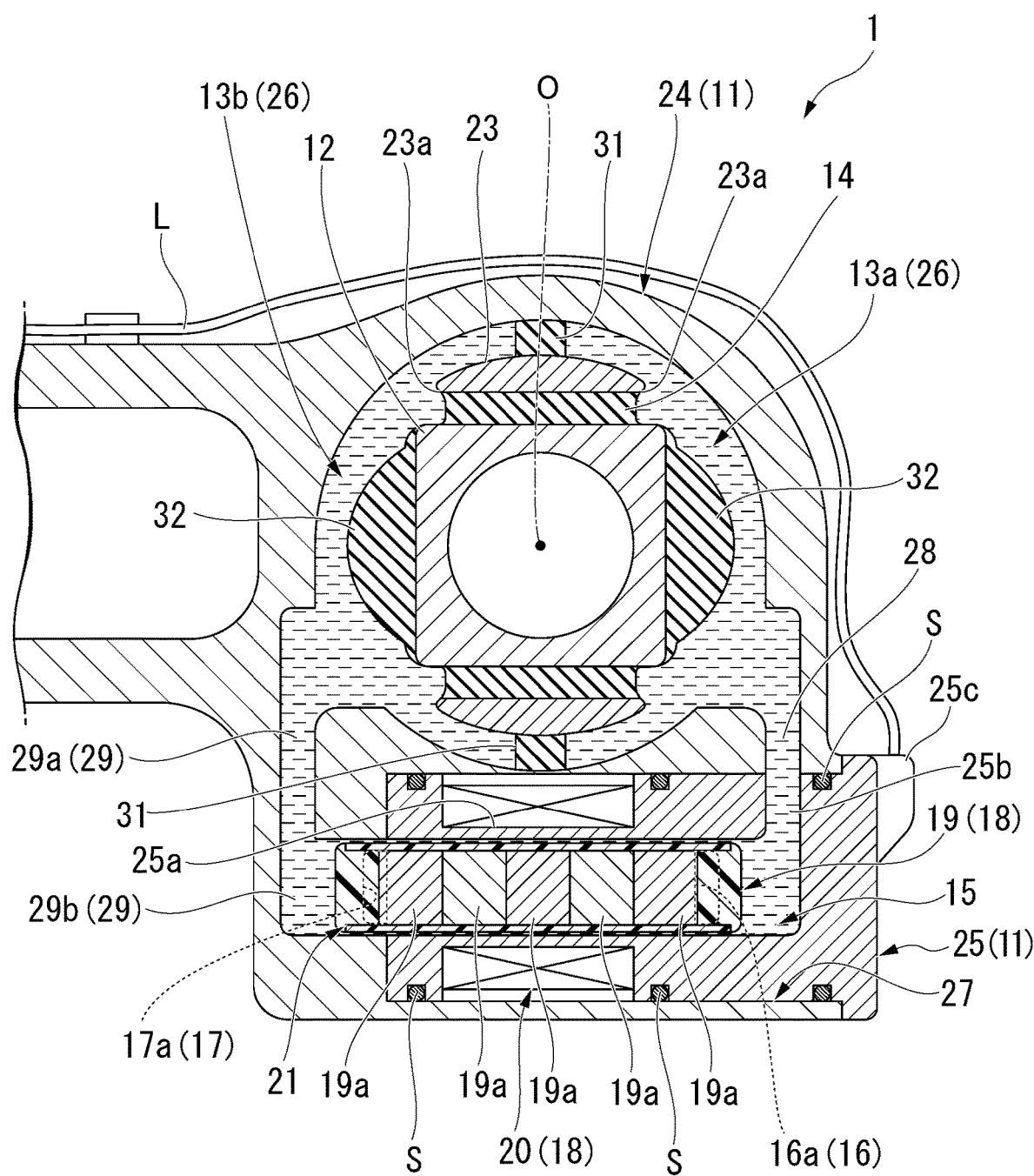
FIG. 1 is a vertical cross-sectional view of a liquid seal bushing according to a first embodiment of the present invention.
Figure 2:
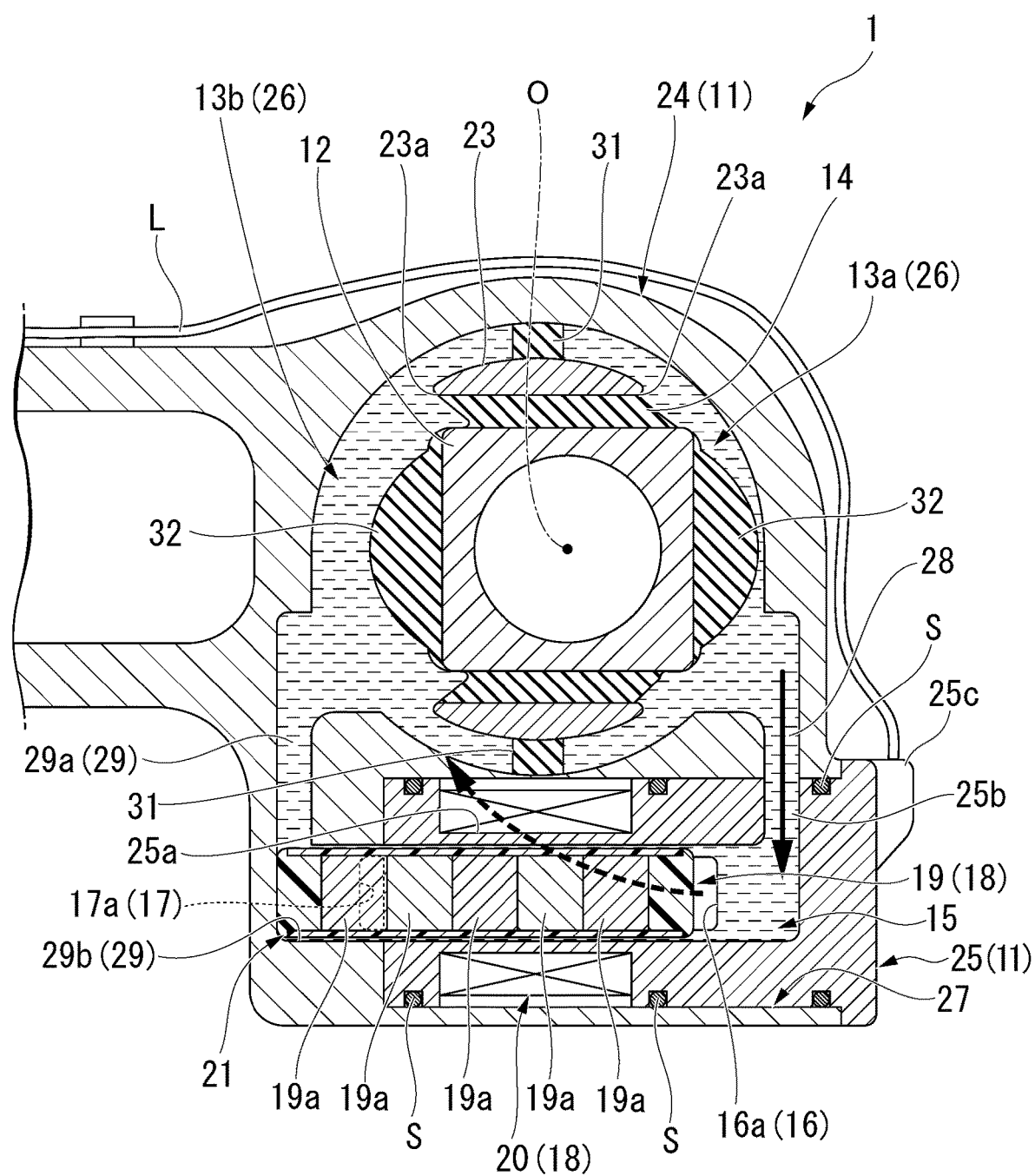
FIG. 2 is a schematic view showing a state in which an inner member is displaced to a right side with respect to an outer member in the liquid seal bushing of FIG. 1.
Figure 3:
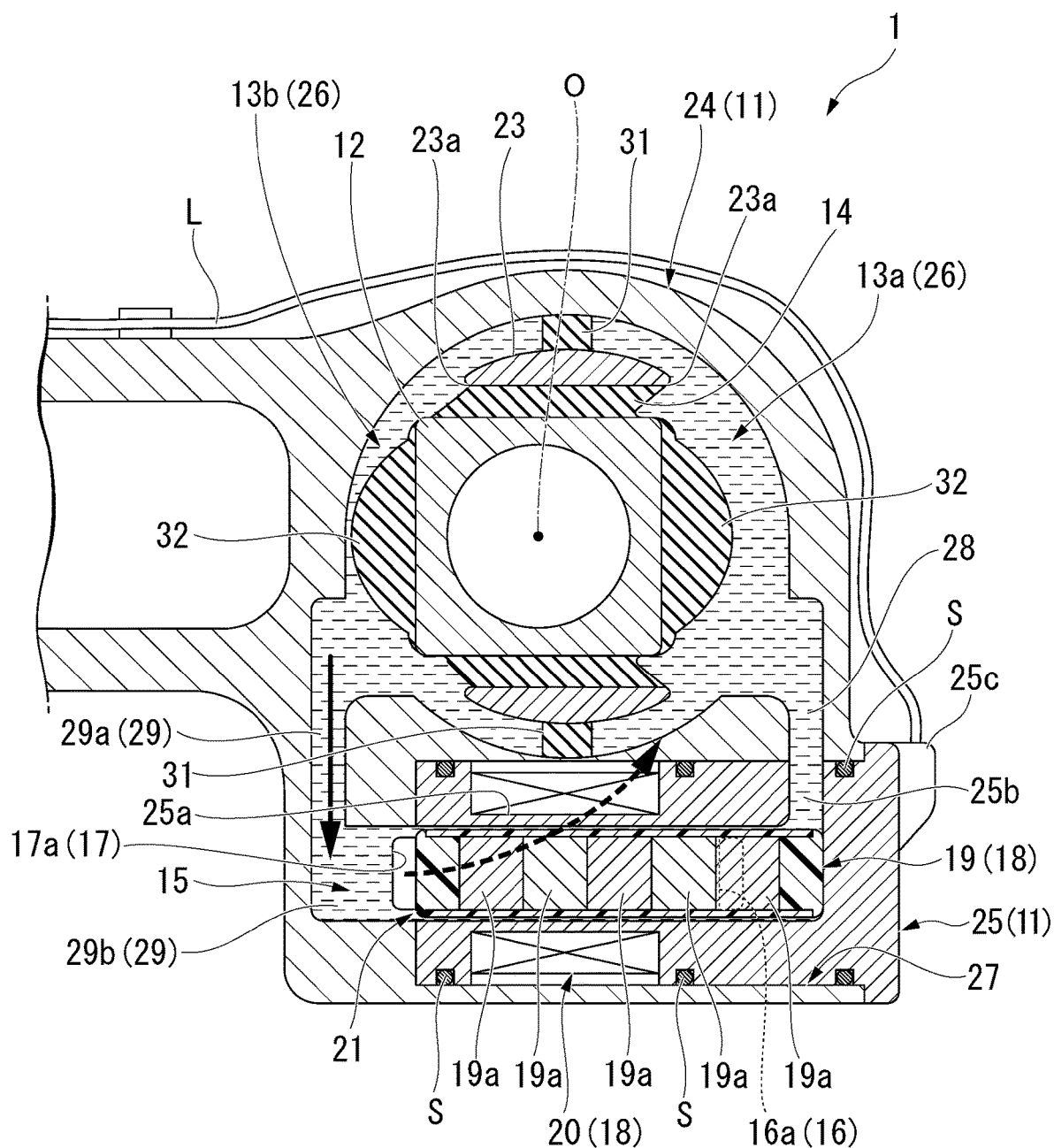
FIG. 3 is a schematic view showing a state in which the inner member is displaced to a left side with respect to the outer member in the liquid seal bushing of FIG. 1.

As shown in FIGS. 1 to 3, a liquid seal bushing 1 includes an outer member 11 which is attached to any one of a vibration generating portion and a vibration receiving portion, an inner member 12 which is attached to the other of the vibration generating portion and the vibration receiving portion and disposed inside the outer member 11, an intermediate cylinder 23 which is disposed between the outer member 11 and the inner member 12, and an elastic body 14 which connects an outer peripheral surface of the inner member 12 and an inner peripheral surface of the intermediate cylinder 23 to each other.

The outer member 11 includes a main body member 24 and an insertion member 25, and a linear motor 18 is provided inside the outer member 11. The main body member 24 and the insertion member 25 are formed of a non-magnetic material.

The main body member 24 is formed with a main body rubber accommodating portion 26, an insertion recessed portion 27, a first connection path 28, and a second connection path 29.

The main body rubber accommodating portion 26 has a circular shape when viewed from the front. In a front view, a straight line passing through a center of this circular shape is referred to as a central axis O, a direction intersecting the central axis O is referred to as a radial direction, and a direction rotating around the central axis O is referred to as a circumferential direction.

The inner member 12 is formed in a tubular shape and is disposed coaxially with the central axis O.

The insertion recessed portion 27 is disposed at a position away from the main body rubber accommodating portion 26 in an axial direction along the central axis O, that is, when viewed from the front. Hereinafter, in a front view, a side where the insertion recessed portion 27 is located with respect to the main body rubber accommodating portion 26 is referred to as a lower side, and a side where the main body rubber accommodating portion 26 is located with respect to the insertion recessed portion 27 is referred to as an upper side.

The insertion recessed portion 27 extends in a lateral direction orthogonal to both the axial direction and an up-down direction. In both end portions of the insertion recessed portion 27 in the lateral direction, one end portion is open to an outer surface of the main body member 24. Positions of the insertion recessed portion 27 and the main body rubber accommodating portion 26 in the lateral direction are substantially equal to each other.

For example, the liquid seal bushing 1 is applied to a suspension device of a vehicle. Moreover, for example, a lower arm or the like is fitted into the inner member 12, and the liquid seal bushing 1 is provided in a state where the axial direction thereof coincides with a front-rear direction of the vehicle and the lateral direction thereof coincides with a left-right direction of the vehicle.

The first connection path 28 connects end portions on one side in the lateral direction of each of the main body rubber accommodating portion 26 and the insertion recessed portion 27. The first connection path 28 extends in the up-down direction and is open to the inner peripheral surface of the insertion recessed portion 27.

The second connection path 29 connects the other end portions in the lateral direction of each of the main body rubber accommodating portion 26 and the insertion recessed portion 27.

The second connection path 29 includes an upper portion 29a which extends downward from the main body rubber accommodating portion 26 and a lower portion 29b which extends in the lateral direction from a lower end portion of the upper portion 29a and is open to an end surface of an inner surface of the insertion recessed portion 27 facing the lateral direction.

The insertion member 25 is formed in a tubular shape in which one end portion in the lateral direction is closed, and is fitted into the insertion recessed portion 27. The insertion member 25 closes an opening portion of the insertion recessed portion 27 on the outer surface of the main body member 24. A connecting hole 25b which allows communication between the first connection path 28 and the inside of the insertion member 25 is formed in a portion of the insertion member 25 facing the first connection path 28. The connecting hole 25b extends in the up-down direction.

A connector accommodating portion 25c in which a connector to which an electric wire L is connected is accommodated is provided in a portion of the insertion member 25 protruding laterally from an outer surface of the main body member 24.

An inner peripheral surface of the insertion member 25 is disposed coaxially with the lower portion 29b of the second connection path 29, and inner diameters of the insertion member 25 and the lower portion 29b of the second connection path 29 are equal to each other. As a result, the inside of the insertion member 25 and the lower portion 29b of the second connection path 29 form a connection path 15 extending in the lateral direction (one direction) and provided inside the outer member 11. The connection path 15 is each connected to both end portions of the main body rubber accommodating portion 26 in the lateral direction through the first connection path 28 and the upper portion 29a of the second connection path 29.

A movable element 19 of the linear motor 18 is provided in the connection path 15 so as to be movable in the lateral direction. The movable element 19 includes a plurality of permanent magnets 19a connected in the lateral direction. The permanent magnets 19a are disposed in a state where the same magnetic poles face each other such that a repulsive force is generated between the adjacent permanent magnets 19a.

A small gap is provided between the outer peripheral surface of the movable element 19 and the inner peripheral surface of the connection path 15 such that a liquid described later does not flow therethrough and the movable element 19 can move in the lateral direction. When a vibration is input, the movable element 19 moves laterally in the connection path 15.

At least one of the outer peripheral surface of the movable element 19 and the inner peripheral surface of the connection path 15 is formed of a low friction material 21 having a coefficient of static friction smaller than a coefficient of static friction of the outer peripheral surface of the permanent magnet 19a. In the shown example, the low friction material 21 is formed of, for example, polyacetal or the like, and integrally covers all of the plurality of permanent magnets 19a. The inner peripheral surface of the connection path 15 may be formed of the low friction material 21.

An annular recessed portion 25a is formed on the outer peripheral surface of the insertion member 25, which extends continuously over the entire circumference and accommodates a coil 20 of the linear motor 18. Lateral positions of a lateral central portion of the annular recessed portion 25a and the central axis O are equal to each other. A plurality of the coils 20 are provided along the lateral direction. The plurality of coils 20 are provided over the entire length in the lateral direction in the annular recessed portion 25a. The coil 20 is connected to a three-phase AC power supply (not shown) via the electric wire L. Lateral positions of the lateral central portions of all of the plurality of coils 20 and the lateral central portions of the movable element 19 are equal to each other in the lateral direction. The coil 20 surrounds the movable element 19.

A plurality of sealing materials S are disposed between the outer peripheral surface of the insertion member 25 and the inner peripheral surface of the insertion recessed portion 27 with lateral intervals. The sealing materials S are provided between the outer peripheral surface of the insertion member 25 and the inner peripheral surface of the insertion recessed portion 27 at each position where the annular recessed portion 25a is interposed therebetween in the lateral direction and at each position where the connecting hole 25b is interposed therebetween in the lateral direction.

In the shown example, three sealing materials S are provided, and in a portion between the outer peripheral surface of the insertion member 25 and the inner peripheral surface of the insertion recessed portion 27, one sealing material S is provided between the annular recessed portion 25a and the connecting hole 25b.

Here, the inner member 12, the intermediate cylinder 23, and the elastic body 14 are disposed in the main body rubber accommodating portion 26 of the outer member 11.

The inner member 12 and the intermediate cylinder 23 are disposed coaxially with the central axis O. The inner member 12 is disposed inside the intermediate cylinder 23. An outer diameter of the intermediate cylinder 23 is smaller than an inner diameter of the main body rubber accommodating portion 26. Two through holes 23a are formed in the intermediate cylinder 23 at intervals in the circumferential direction, and the through holes 23a face each other in the radial direction. The two through holes 23*a* pass through the intermediate cylinder 23 in the lateral direction. The through holes 23*a* are formed in the entire portion of the intermediate cylinder 23 that is located inside in the axial direction from both end portions in the axial direction.

The elastic body 14 is connected to a portion of the inner peripheral surface of the intermediate cylinder 23 located between the two through holes 23*a* and an opening peripheral edge of the through hole 23*a*. The elastic body 14 is connected over the entire circumference of an opening peripheral edge of the through hole 23*a* on the inner peripheral surface of the intermediate cylinder 23. The elastic body 14 is made of a rubber material.

In the outer peripheral surface of the intermediate cylinder 23, each portion located between the through holes 23*a* adjacent to each other in the circumferential direction and the inner peripheral surface of the main body rubber accommodating portion 26 are connected by a partition wall 31. In the outer peripheral surfaces of the intermediate cylinder 23, any one of portions located between the through holes 23*a* adjacent to each other in the circumferential direction is located at an upper end and faces upward, and the other thereof is located at a lower end and faces downward. The partition wall 31 is connected to a central portion in the circumferential direction of the outer peripheral surface of the intermediate cylinder 23, which is located between the through holes 23*a* adjacent to each other in the circumferential direction. Lateral positions of the partition wall 31 and the central axis O are equal to each other. The partition wall 31 is formed of a rubber material.

An annular protrusion portion (not shown) extending continuously over the entire circumference is disposed at both end portions in the axial direction on the outer peripheral surface of the intermediate cylinder 23. The annular protrusion portion is formed so as to be elastically deformable, and is in pressure contact with the inner peripheral surface of the main body rubber accommodating portion 26. The partition wall 31 extends in the axial direction and axially connects the annular protrusion portions disposed at both end portions of the intermediate cylinder 23 in the axial direction.

From the above, the outer member 11 and the inner member 12 are connected by the elastic body 14 via the intermediate cylinder 23, the annular protrusion portion, and the partition wall 31. That is, the outer member 11 and the inner member 12 are connected by the elastic body 14.

The inner peripheral surface of the main body rubber accommodating portion 26 and the outer peripheral surface of the inner member 12 may be directly connected by the elastic body 14 without disposing the intermediate cylinder 23.

Here, for example, a liquid such as ethylene glycol, water, or silicone oil is sealed inside the outer member 11. In the shown example, the liquid fills the main body rubber accommodating portion 26, the first connection path 28, the connecting hole 25*b*, the inside of the insertion member 25, and the second connection path 29. As a result, two liquid chambers 13*a* and 13*b*, which are partitioned by at least the inner peripheral surface of the main body rubber accommodating portion 26, the outer peripheral surface of the intermediate cylinder 23, the partition wall 31, and the annular protrusion portion and are arranged in the lateral direction, are provided inside the outer member 11.

Then, according to an input of a vibration in the lateral direction, the elastic body 14 is elastically deformed, the outer member 11 and the inner member 12 are relatively displaced, a volume of any one of the two liquid chambers 13*a* and 13*b* is expanded, and a volume of the other thereof is reduced.

One liquid chamber 13*a* of the two liquid chambers 13*a* and 13*b* is connected to the connection path 15 through the first connection path 28 and the connecting hole 25*b*, and the other liquid chamber 13*b* thereof is connected to the connection path 15 through the upper portion 29*a* of the second connection path 29. That is, the connection path 15 connects the two liquid chambers 13*a* and 13*b* to each other.

Each of the two liquid chambers 13*a* and 13*b* includes a stopper protrusion portion 32 which protrudes outward in the radial direction and can come into contact with the inner peripheral surface of the main body rubber accommodating portion 26. The stopper protrusion portion 32 protrudes outward from the outer peripheral surface of the inner member 12 in the radial direction. The stopper protrusion portion 32 is disposed at a central portion in the axial direction in each of the inner member 12 and the liquid chambers 13*a* and 13*b*.

In the stopper protrusion portions 32, at least an outer end portion in the radial direction is formed of an elastic material. In the shown example, the entire stopper protrusion portion 32 is made of a rubber material. A radial gap is provided between a radial outer end portion of the stopper protrusion portion 32 and the inner peripheral surface of the main body rubber accommodating portion 26.

The stopper protrusion portion 32, the annular protrusion portion, the partition wall 31, and the elastic body 14 are integrally formed.

Inside the outer member 11, the first communication path 16 which allows communication between one end portion of both end portions in the lateral direction in the connection path 15, the one end portion being located on the side of one liquid chamber 13*a* of the two liquid chambers 13*a* and 13*b*, and the other liquid chamber 13*b*, and the second communication path 17 which allows communication between the other end portion being located on the side of the other liquid chamber 13*b* of both end portions of the connection path 15, and the one liquid chamber 13*a* are provided.

The first communication path 16 directly connects one end portion of the connection path 15 and the other liquid chamber 13*b* as shown in FIG. 2, and the second communication path 17 directly connects the other end portion of the connection path 15 and one liquid chamber 13*a* as shown in FIG. 3.

Then, the movable element 19 is provided such that the movable element 19 is able to close both the openings 16*a* and 17*a* of the first communication path 16 and the second communication path 17 in the connection path 15 as shown in FIG. 1, and such that the movable element 19 is able to open both the openings 16*a* and 17*a* as the movable element 19 moves along the lateral direction as shown in FIGS. 2 and 3.

As described above, according to the liquid seal bushing 1 according to the present embodiment, the movable element 19 of the linear motor 18 is provided in the connection path 15 so as to be movable in the lateral direction, and closes both openings 16*a* and 17*a* of the first communication path 16 and the second communication path 17 in the connection path 15. Accordingly, when a high-frequency vibration with a small amplitude is input, a control current is supplied to the coil 20, and it is possible to vibrate the movable element 19 in the lateral direction with a small amplitude in a state where the openings 16*a* and 17*a* in the connection path 15 are closed.

As a result, when a high-frequency vibration with a small amplitude is input, the control current is supplied to the coil 20, it is possible to vibrate the movable element 19 in the lateral direction such that a relative displacement of the outer member 11 and the inner member 12 becomes a controllable hydraulic pressure, and it is possible to prevent the input vibration from propagating to the vibration receiving portion.

The movable element 19 of the linear motor 18 is provided such that the openings 16a and 17a in the connection path 15 can be opened as the movable element 19 moves along the lateral direction. Accordingly, when a low-frequency vibration with a large amplitude is input, as shown in FIGS. 2 and 3, the movable element 19 moves in a direction (hereinafter, referred to as a bound direction, and the opposite direction is referred to as a rebound direction) away from the liquid chamber of the two liquid chambers 13a and 13b whose volume is reduced along the lateral direction, one of the openings 16a and 17a in the connection path 15 is opened, and the liquid in the connection path 15 flows into the liquid chamber having the expanded volume of the two liquid chambers 13a and 13b through the first communication path 16 or the second communication path 17.

In this case, for example, by detecting acceleration or the like of the input vibration, a control current having a magnitude obtained based on the detected value is supplied to the coil 20, a position of the movable element 19 along the lateral direction is controlled while a damping force in the rebound direction is applied to the movable element 19, and it is possible to adjust an opening area of any one of the openings 16a and 17a in the connection path 15. Moreover, when the movable element 19 moves in the rebound direction, a control current having a magnitude obtained based on the detected value is supplied to the coil 20, the position of the movable element 19 along the lateral direction is controlled while the damping force in the bound direction is applied to the movable element 19, it is possible to adjust an opening area of the other of the openings 16a and 17a in the connection path 15, and thus, the input vibration can be attenuated and absorbed.

From the above, it is possible to prevent the input vibration from propagating to the vibration receiving portion over a wide frequency range.

When a low-frequency vibration with a large amplitude is input, the damping force along the lateral direction applied to the movable element 19 can be controlled not only by the control current supplied to the coil 20 but also by a size of the opening area of each of the openings 16a and 17a in the connection path 15 changeable by the position of the movable element 19 along the lateral direction, and thus, the control current supplied to the coil 20 can be suppressed low.

Since the actuator including the movable element 19 described above is the linear motor 18, it is possible to realize a configuration in which the moving member does not protrude to the outside of the outer member 11, and airtightness inside the outer member 11 can be easily secured.

At least one of the outer peripheral surface of the movable element 19 and the inner peripheral surface of the connection path 15 is formed of the low friction material 21 having a coefficient of static friction smaller than the coefficient of static friction of the outer peripheral surface of the permanent magnet 19a. Accordingly, even when a current value supplied to the coil 20 is low and the movable element 19 does not sufficiently float in the connection path 15 and is in contact with the inner peripheral surface of the connection path 15, the movable element 19 can be driven smoothly. Moreover, even when the control current supplied to the coil 20 is suppressed to a low level, the position of the movable element 19 along the lateral direction can be accurately controlled.

Figure 4:
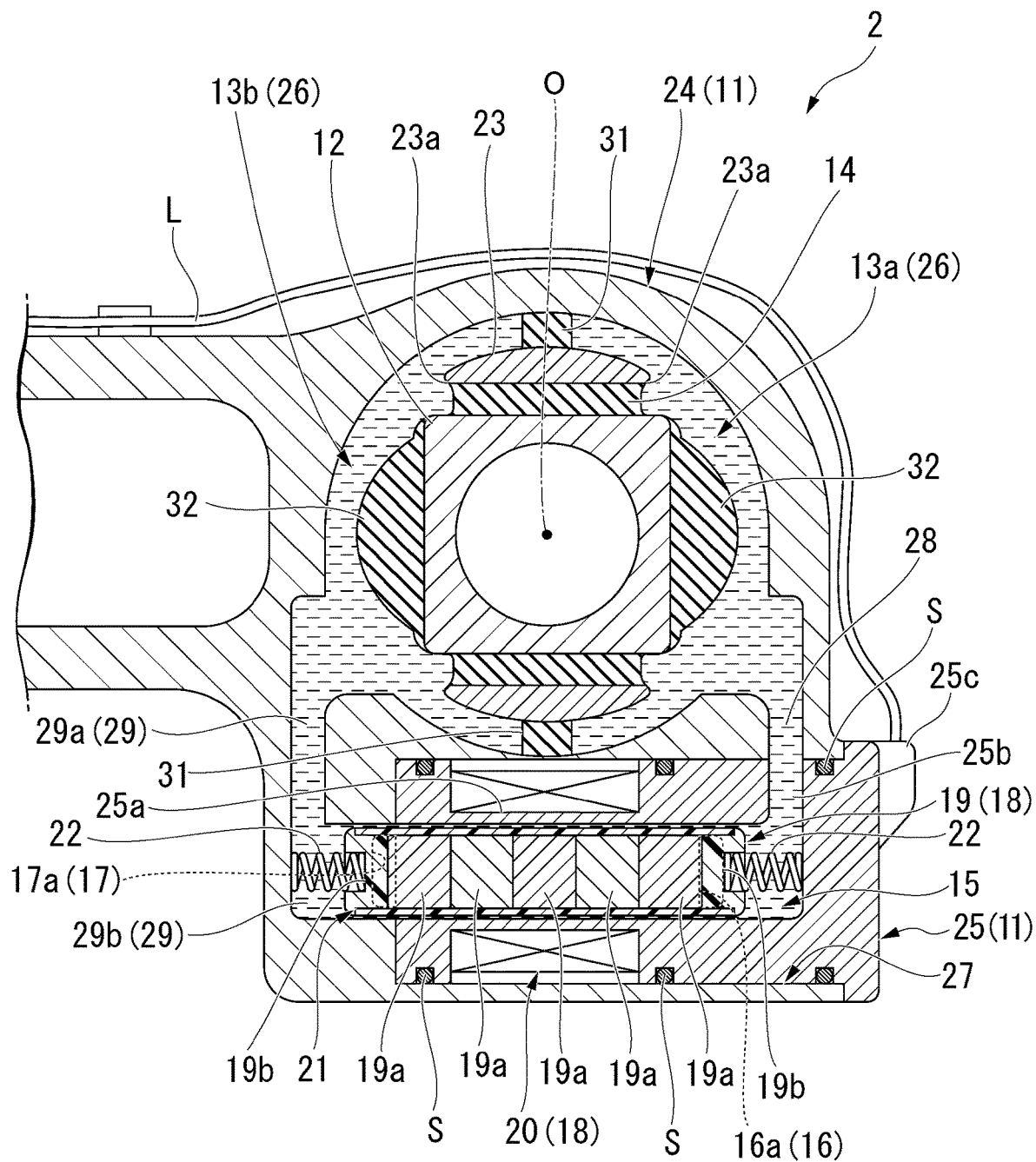
FIG. 4 is a vertical cross-sectional view of a liquid seal bushing according to a second embodiment of the present invention.

Next, a liquid seal bushing 2 according to a second embodiment of the present invention will be described with reference to FIG. 4.

In the second embodiment, the same portions as the components in the first embodiment are designated by the same reference numerals, descriptions thereof will be omitted, and only the different points will be described.

In the present embodiment, an elastic member 22, which elastically deforms when the movable element 19 moves toward one side in the lateral direction to bias the movable element 19 toward the other side in the lateral direction, is provided in the connection path 15.

One elastic member 22 is provided on each of both sides of the movable element 19 interposing the movable element 19 in the lateral direction. Spring constants of the elastic members 22 are the same as each other. One end portion of both end portions of the elastic member 22 is fitted into a dent portion 19b formed in a lateral end surface of the movable element 19, and the other end is supported by an end surface of the inner surface of the connection path 15 facing in the lateral direction. The dent portion 19b is formed only in the portion of the low friction material 21 of the movable element 19, and is not formed in the permanent magnet 19a. The elastic member 22 is a coil spring.

For example, the spring constants of the elastic members 22 may be different from each other, the elastic member 22 may be provided on only one of both sides of the movable element 19 interposing the movable element 19 in the lateral direction, and the elastic member 22 is not limited to the coil spring and may be changed as appropriate.

As described above, according to the liquid seal bushing 2 of the present embodiment, the elastic member 22, which biases the movable element 19 toward the other side in the lateral direction when the movable element 19 moves toward one side in the lateral direction, is provided in the connection path 15. Accordingly, by elastically deforming the elastic member 22 when a high-frequency vibration with a small amplitude is input, the movable element 19 can be vibrated with a small amplitude in the lateral direction such that the relative displacement of the outer member 11 and the inner member 12 is a controllable hydraulic pressure, and the control current supplied to the coil 20 can be suppressed low.

A technical scope of the present invention is not limited to the above-described embodiments, and various modifications can be made without departing from the scope of the present invention.

For example, in the above-described embodiments, at least one of the outer peripheral surface of the movable element 19 and the inner peripheral surface of the connection path 15 is formed of the low friction material 21 described above. However, at least one of the outer peripheral surface of the movable element 19 and the inner peripheral surface of the connection path 15 may be formed of a material having a coefficient of static friction equal to or higher than the coefficient of static friction of the outer peripheral surface of the permanent magnet 19a.

The liquid seal bushings 1 and 2 may be applied to a torsion beam type rear suspension, a vehicle engine mount, a generator mount mounted on a construction machine, a machine mount installed in a factory or the like, and the like.

In addition, it is possible to replace the components in the above-described embodiments with well-known components as appropriate without departing from the scope of the present invention, and the above-described embodiments and modifications may be appropriately combined.

According to the present invention, the movable element of the linear motor is provided in the connection path so as to be movable in one direction, and closes both openings of the first communication path and the second communication path in the connection path. Accordingly, when a high-frequency vibration with a small amplitude is input, a control current is supplied to the coil, and it is possible to vibrate the movable element in the one direction with a small amplitude in a state where the openings of the first communication path and the second communication path in the connection path are closed. As a result, when a high-frequency vibration with a small amplitude is input, the control current is supplied to the coil, it is possible to vibrate the movable element in the one direction such that a relative displacement of the outer member and the inner member becomes a controllable hydraulic pressure, and it is possible to prevent the input vibration from propagating to the vibration receiving portion.

The movable element of the linear motor is provided such that the openings of the first communication path and the second communication path in the connection path can be opened as the movable element moves along the one direction. Accordingly, when a low-frequency vibration with a large amplitude is input, the movable element moves in a direction (hereinafter, referred to as a bound direction, and the opposite direction is referred to as a rebound direction) away from the liquid chamber of the two liquid chambers whose volume is reduced along the one direction, one of the openings of the first communication path and the second communication path in the connection path is opened, and the liquid in the connection path flows into the liquid chamber having the expanded volume of the two liquid chambers through the first communication path or the second communication path.

In this case, for example, by detecting acceleration or the like of the input vibration, a control current having a magnitude obtained based on the detected value is supplied to the coil, a position of the movable element along the one direction is controlled while a damping force in the rebound direction is applied to the movable element, and it is possible to adjust an opening area of any one of the openings of the first communication path and the second communication path in the connection path. Moreover, when the movable element moves in the rebound direction, a control current having a magnitude obtained based on the detected value is supplied to the coil, the position of the movable element along the one direction is controlled while the damping force in the bound direction is applied to the movable element, it is possible to adjust an opening area of the other of the openings of the first communication path and the second communication path in the connection path, and thus, the input vibration can be attenuated and absorbed.

From the above, it is possible to prevent the input vibration from propagating to the vibration receiving portion over a wide frequency range.

When a low-frequency vibration with a large amplitude is input, the damping force along the one direction applied to the movable element can be controlled not only by the control current supplied to the coil but also by a size of the opening area of each of the openings of the first communication path and the second communication path in the connection path changeable by the position of the movable element along the one direction, and thus, the control current supplied to the coil can be suppressed low.

Since the actuator including the movable element described above is the linear motor, it is possible to realize a configuration in which the moving member does not protrude to the outside of the outer member, and airtightness inside the outer member can be easily secured.

Here, the movable element may include a plurality of permanent magnets connected in the one direction, and at least one of an outer peripheral surface of the movable element and an inner peripheral surface of the connection path may be formed of a low friction material having a coefficient of static friction smaller than a coefficient of static friction of an outer peripheral surface of the permanent magnet.

In this case, at least one of the outer peripheral surface of the movable element and the inner peripheral surface of the connection path is formed of a low friction material having the coefficient of static friction smaller than the coefficient of static friction of an outer peripheral surface of the permanent magnet. Accordingly, even when a current value supplied to the coil is low and the movable element does not sufficiently float in the connection path and is in contact with the inner peripheral surface of the connection path, the movable element can be driven smoothly. Moreover, even when the control current supplied to the coil is suppressed to a low level, the position of the movable element along the one direction can be accurately controlled.

Further, the elastic member, which elastically deforms when the movable element moves toward one side in the one direction to bias the movable element toward the other side in the one direction, may be provided in the connection path.

In this case, the elastic member, which biases the movable element toward the other side in the one direction when the movable element moves toward one side in the one direction, is provided in the connection path. Accordingly, by elastically deforming the elastic member when a high-frequency vibration with a small amplitude is input, the movable element can be vibrated with a small amplitude in the one direction such that the relative displacement of the outer member and the inner member is a controllable hydraulic pressure, and the control current supplied to the coil can be suppressed low.

Industrial Applicability

By applying a liquid seal bushing of the present application to a relevant field, it is possible to prevent an input vibration from propagating to a vibration receiving portion over a wide frequency range.

REFERENCE SIGNS LIST

1, 2: Liquid seal bushing
11: Outer member
12: Inner member
13a, 13b: Liquid chamber
14: Elastic body
15: Connection path
16: First communication path
16a: Opening of first communication path in connection path
17: Second communication path
17a: Opening of second communication path in connection path
18: Linear motor
19: Movable element 19a: Permanent magnet
20: Coil
21: Low friction material
22: Elastic member

The invention claimed is:

1. A liquid seal bushing comprising:
an outer member which is attached to any one of a vibration generating portion and a vibration receiving portion;
an inner member which is attached to the other of the vibration generating portion and the vibration receiving portion and disposed inside the outer member; and
an elastic body which connects the outer member and the inner member to each other,
wherein two liquid chambers,
a connection path which connects the two liquid chambers and extends in one direction,
a first communication path which allows communication between one end portion of both end portions of the connection path, the one end portion being located on a side of one liquid chamber of the two liquid chambers, and the other liquid chamber of the two liquid chambers,
a second communication path which allows communication between the other end portion of the both end portions of the connection path, the other end portion being located on a side of the other liquid chamber, and the one liquid chamber, and
a linear motor are provided inside the outer member, and the linear motor includes
a movable element which is provided in the connection path to be movable in the one direction, closes both openings of the first communication path and the second communication path in the connection path, and opens each opening according to a movement in the one direction, and
a coil which surrounds the movable element.

2. The liquid seal bushing according to claim 1,
wherein the movable element includes a plurality of permanent magnets connected in the one direction, and
at least one of an outer peripheral surface of the movable element and an inner peripheral surface of the connection path is formed of a low friction material having a coefficient of static friction smaller than a coefficient of static friction of an outer peripheral surface of the permanent magnet.

3. The liquid seal bushing according to claim 2,
wherein an elastic member, which elastically deforms when the movable element moves toward one side in the one direction to bias the movable element toward the other side in the one direction, is provided in the connection path.

4. The liquid seal bushing according to claim 1,
wherein an elastic member, which elastically deforms when the movable element moves toward one side in the one direction to bias the movable element toward the other side in the one direction, is provided in the connection path.

* * * * *